(12) United States Patent
Wakayanagi et al.

(10) Patent No.: US 10,422,656 B2
(45) Date of Patent: Sep. 24, 2019

(54) MAP DISPLAY CONTROL DEVICE AND AUTOMATIC MAP SCROLLING METHOD

(71) Applicant: MITSUBISHI ELECTRIC CORPORATION, Tokyo (JP)

(72) Inventors: Haruhiko Wakayanagi, Tokyo (JP); Mitsuo Shimotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 95 days.

(21) Appl. No.: 15/536,388

(22) PCT Filed: Mar. 16, 2015

(86) PCT No.: PCT/JP2015/057646
§ 371 (c)(1),
(2) Date: Jun. 15, 2017

(87) PCT Pub. No.: WO2016/147286
PCT Pub. Date: Sep. 22, 2016

(65) Prior Publication Data
US 2017/0363438 A1   Dec. 21, 2017

(51) Int. Cl.
*G01C 21/36* (2006.01)
*G09B 29/00* (2006.01)
(Continued)

(52) U.S. Cl.
CPC ......... *G01C 21/367* (2013.01); *G06F 3/0485* (2013.01); *G06F 3/04817* (2013.01);
(Continued)

(58) Field of Classification Search
None
See application file for complete search history.

(56) References Cited

U.S. PATENT DOCUMENTS 8,103,439 B2   1/2012   Onishi et al.
2005/0090977 A1*   4/2005   Takizawa ............. G01C 21/367
                                                    701/455
(Continued)

FOREIGN PATENT DOCUMENTS

CN   101319908 A   12/2008
JP   2002-22470 A   1/2002
(Continued)

OTHER PUBLICATIONS

"Mokutekichi made no Keiro o Kensaku (Jidosha)", Tsukaikonashi ya Apuri no Joho ga Mansai, iPhone People, Mac People, the Dec. 2012 issue, special supplement, Ascii Media Works Inc., Oct. 29, 2012, pp. 14 to 15 (particularly, p. 15, lower right).

(Continued)

*Primary Examiner* — Tamara L Weber
(74) *Attorney, Agent, or Firm* — Birch, Stewart, Kolasch & Birch, LLP

(57) ABSTRACT

A map display control device includes a display processor to cause a display to display a map, an operation information acquiring unit to acquire information on an operation performed by a user, a scroll processor to scroll the map displayed on the display, and a priority object setting unit to determine a priority object having higher priority than other objects contained in the map. The scroll processor scrolls the map in step with an operation performed by the user to scroll the map, and automatically scrolls the map toward the priority object when determining that the operation has been ended.

15 Claims, 16 Drawing Sheets

(51) Int. Cl.
*G06F 3/0481* (2013.01)
*G06F 3/0485* (2013.01)
*G09B 29/10* (2006.01)
*G06F 3/0488* (2013.01)

(52) U.S. Cl.
CPC ........... *G09B 29/00* (2013.01); *G09B 29/106* (2013.01); *G06F 3/04883* (2013.01)

(56) References Cited

U.S. PATENT DOCUMENTS

| | | | |
|---|---|---|---|
| 2008/0288166 A1* | 11/2008 | Onishi | G01C 21/20 701/533 |
| 2008/0306683 A1 | 12/2008 | Ando et al. | |
| 2010/0205563 A1* | 8/2010 | Haapsaari | G06F 3/0482 715/825 |
| 2011/0219330 A1 | 9/2011 | Ando et al. | |
| 2013/0066550 A1* | 3/2013 | Takada | G01C 21/367 701/454 |

FOREIGN PATENT DOCUMENTS

| | | |
|---|---|---|
| JP | 2002-31539 A | 1/2002 |
| JP | 2004-85611 A | 3/2004 |
| JP | 2005-321575 A | 11/2005 |
| JP | 2007-64844 A | 3/2007 |
| JP | 2009-74805 A | 4/2009 |
| JP | 2009-98011 A | 5/2009 |
| JP | 2010-14662 A | 1/2010 |
| JP | 2010-96737 A | 4/2010 |
| JP | 2014-137300 A | 7/2014 |

OTHER PUBLICATIONS

Office Action dated Jan. 14, 2019 in corresponding Chinese Application No. 201580077712.6.

* cited by examiner

F I G. 1
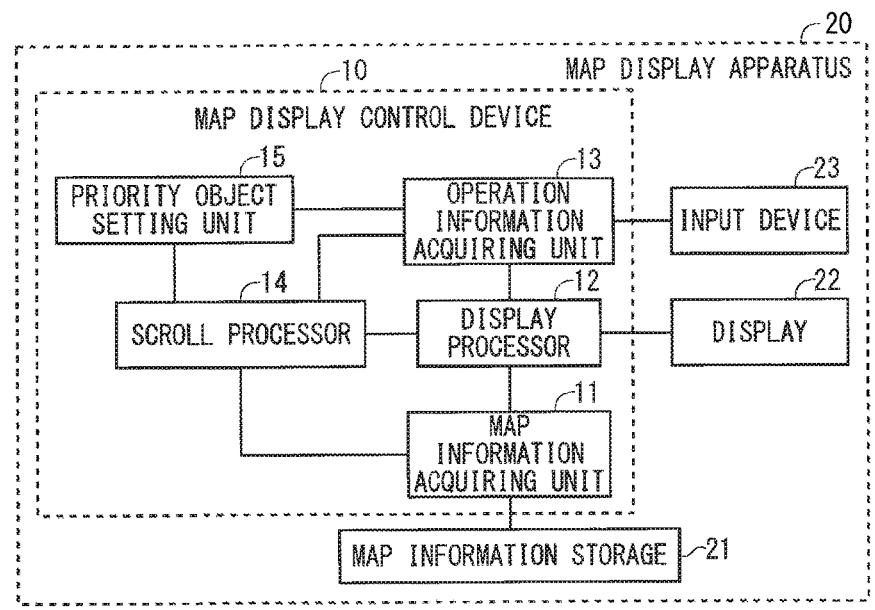
F I G. 2
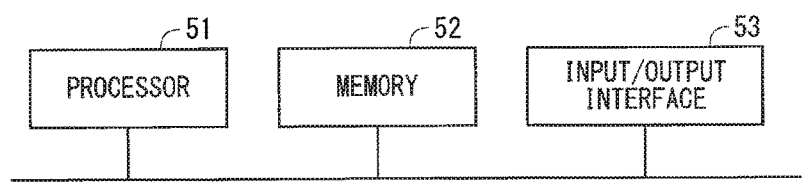

F I G . 3
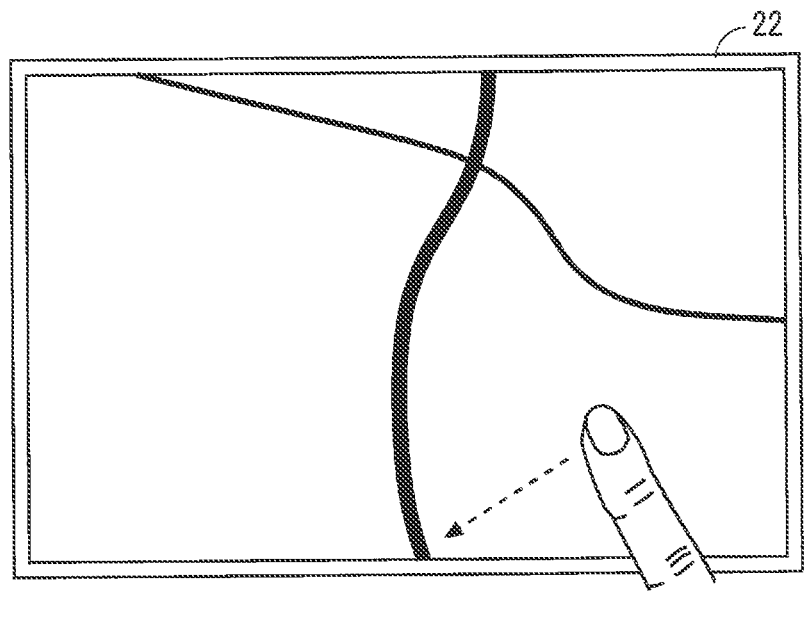
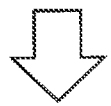
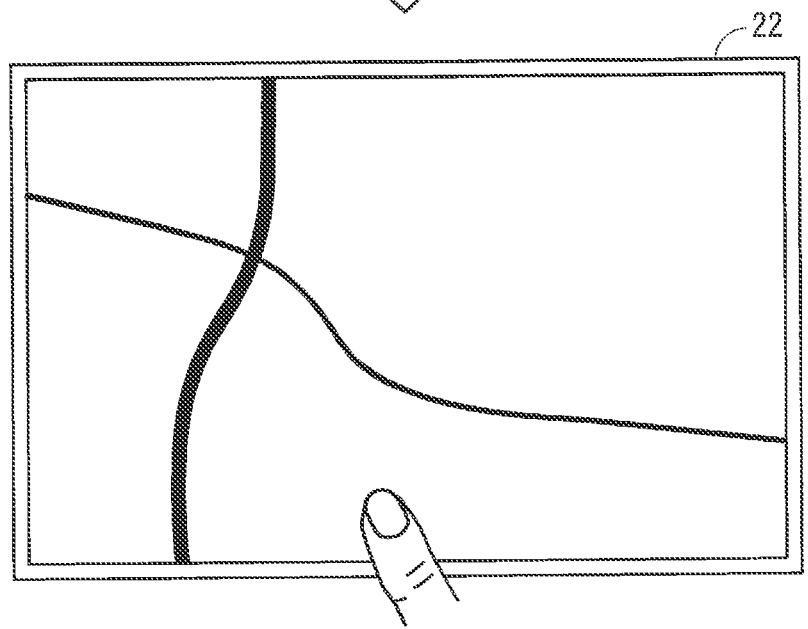

F I G. 6 A
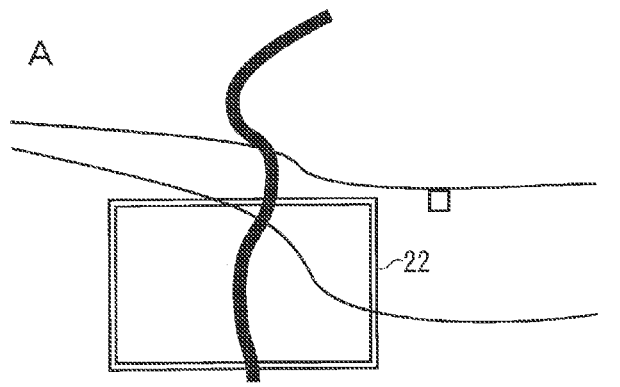
⇩ (MANUAL MAP SCROLLING)
F I G. 6 B
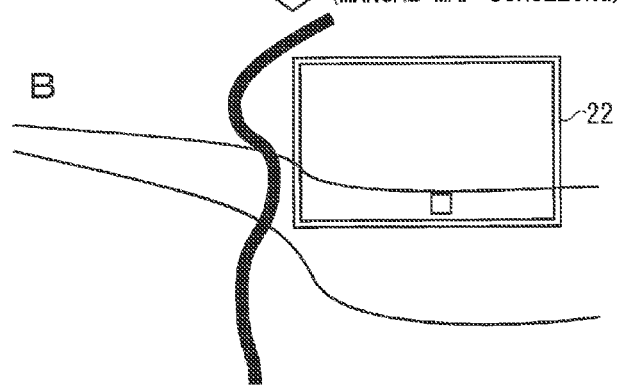
⇩ (AUTOMATIC MAP SCROLLING)
F I G. 6 C
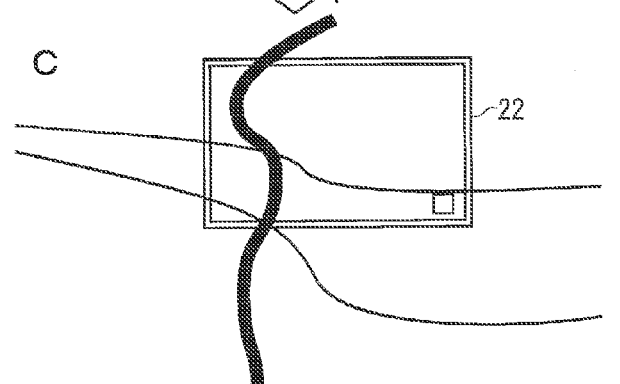
⇩ (AUTOMATIC MAP SCROLLING)
F I G. 6 D
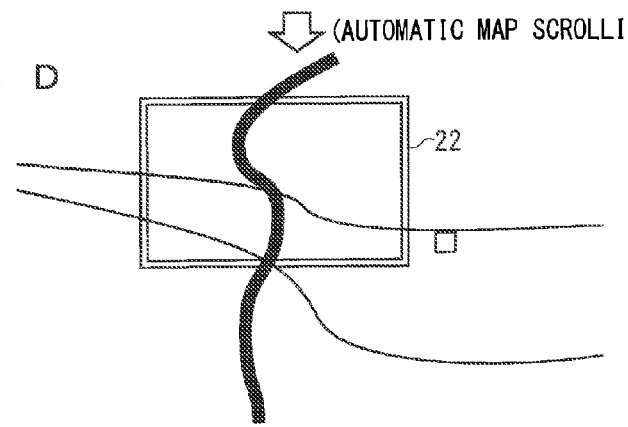

F I G. 8
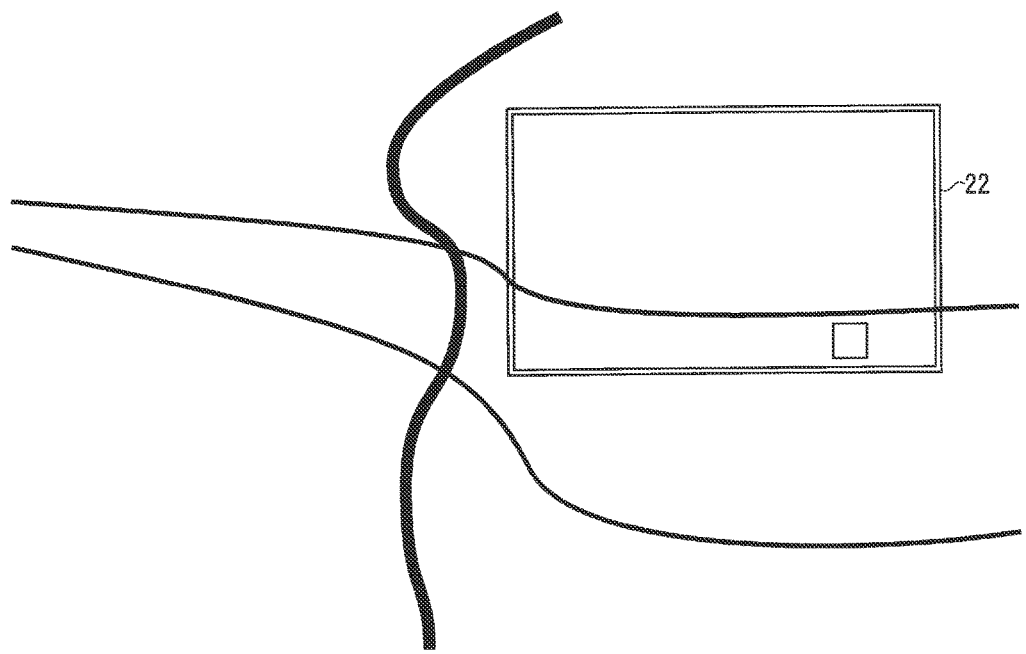
F I G. 9
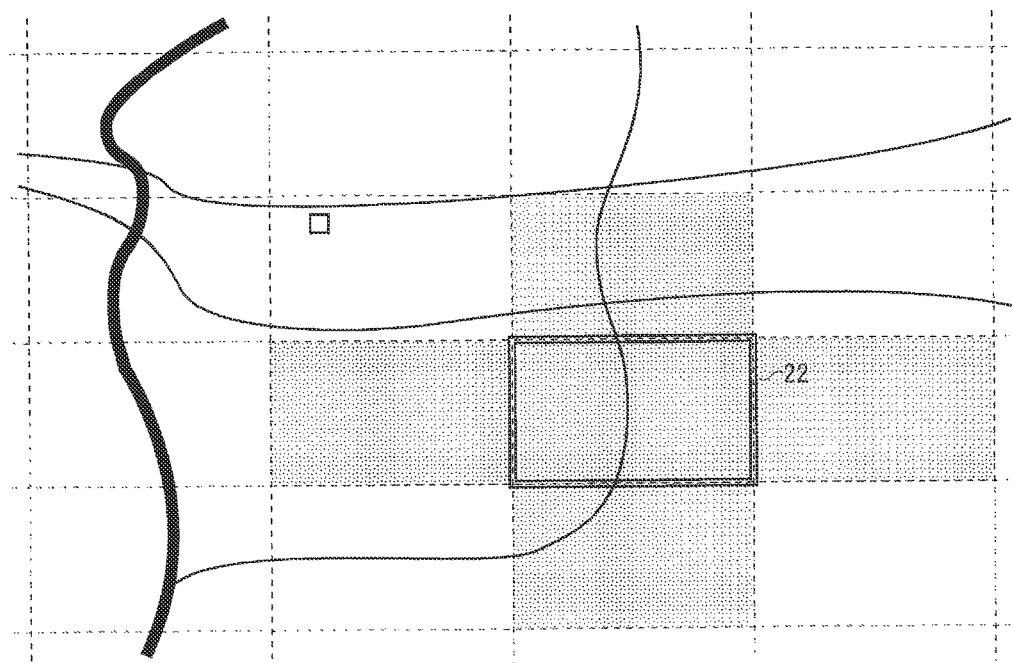

F I G . 1 3
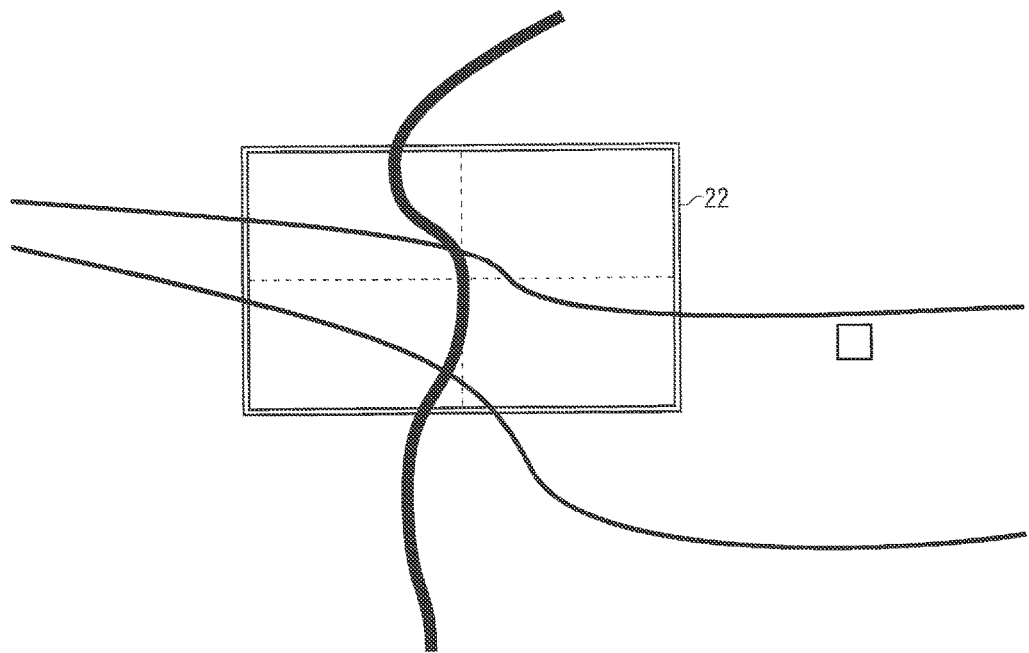
F I G . 1 4
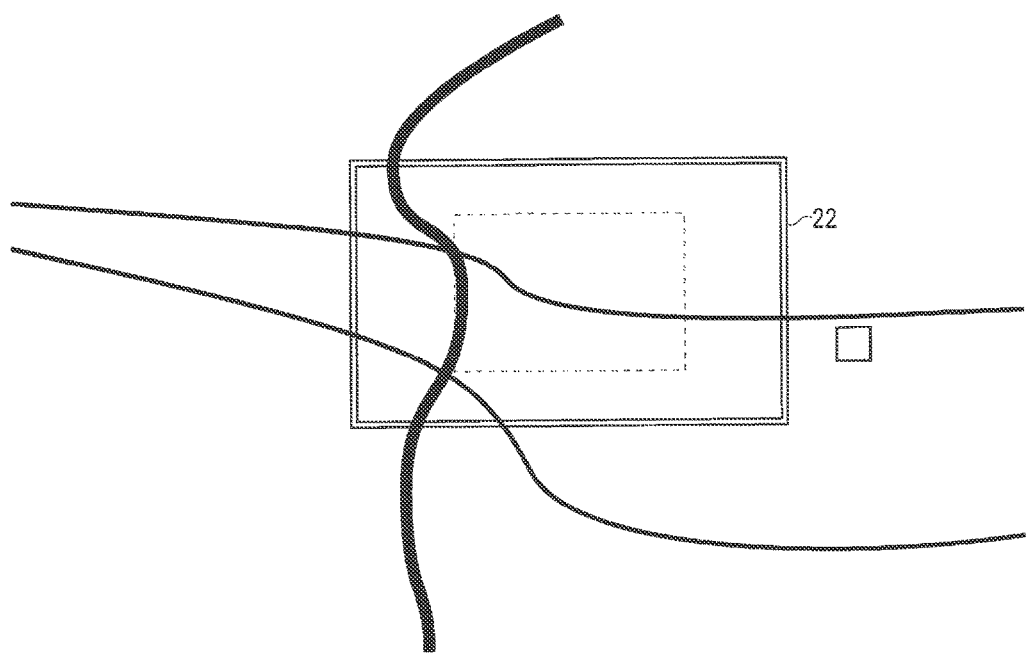

(MANUAL MAP SCROLLING)

(AUTOMATIC MAP SCROLLING)

(AUTOMATIC MAP SCROLLING)

MAP DISPLAY CONTROL DEVICE AND AUTOMATIC MAP SCROLLING METHOD

TECHNICAL FIELD

The present invention relates to a map display control device that controls map display, and particularly relates to a process for scrolling a map on display.

BACKGROUND ART

Apparatuses that display a map on a screen of a display (map display apparatuses), such as navigation devices, have been put to practical use. Most of the map display apparatuses are capable of scrolling a map displayed on a display in response to an operation performed by the user, and various techniques concerning map scrolling have been proposed accordingly.

For example, Patent Document 1 given below discloses a navigation device capable of scrolling a map along an expected travel route (navigation route) to a destination. When a map of a specific place appears during the map scrolling, the navigation device in Patent Document 1 reduces the scrolling speed such that the information on the place is easily visible to the user. Patent Document 2 given below discloses a technique for enabling easy scrolling along an expected travel route in a manner to scroll a map faster in a direction along the expected travel route than in other directions.

PRIOR ART DOCUMENTS

Patent Documents

Patent Document 1: Japanese Patent Application Laid-Open No, 2002-022470
Patent Document 2: Japanese Patent Application Laid-Open No. 2014-137300

SUMMARY

Problems to be Solved by the Invention

A navigation device normally displays a map of an expected travel route and therearound (a map containing at least part of an expected travel route and is hereinafter referred to as a "map containing the expected travel route"). The user sometimes fails to find a facility in the category of his/her choice on the expected travel route or looks for an alternative route, and thus, feels a need to see a map of an area away from the expected travel route (a map containing no expected travel route). In such a case, the user can scroll the map to display the map containing no expected travel route, in place of the map containing the expected travel route.

Then, the user can scroll the map again to restore the map containing the expected travel route. However, this operation presupposes that the user has a correct understanding of the positional relationship between the expected travel route and the map containing no expected travel route. However, after several iterations of map scrolling, the user may become confused about the positional relationship. The techniques of Patent Documents 1 and 2 are intended for map scrolling along the expected travel route, and thus, are not applicable to the state in which a map containing no expected travel route is displayed.

Common navigation devices have the jump function of jumping from a map of any point to a map of the current position in response to one-touch operation. Unlike the scroll function, the jump function does not provide the user with the positional relationship between the map shown prior to the jump and the map shown after the jump. Furthermore, the operation for jumping or automatic scrolling to the map of a point different from the current position is laborious.

The present invention has been made to solve the above-mentioned problems, and therefore has an object to provide a map display control device that enables the user to scroll the map manually and to subsequently display a map of an area including a feature (object) of interest and therearound by no additional operation or an easy operation.

Means to Solve the Problems

A map display control device according to the present invention includes a map information acquiring unit to acquire map information, a display processor to cause a display to display a map based on the map information, an operation information acquiring unit to acquire information on an operation performed by a user with an input device, a scroll processor to scroll the map that the display processor has caused the display to display, and a priority object setting unit to determine a priority object having higher priority than other objects contained in the map. The scroll processor performs manual map scrolling to scroll the map in step with a manual scroll operation performed by the user to scroll the map, and then, performs automatic map scrolling to automatically scroll the map toward the priority object when determining that the manual scroll operation has been ended.

Effects of the Invention

In the present invention, after the map is scrolled in step with the manual scroll operation performed by the user (the manual map scrolling), the map is automatically scrolled toward the priority object of interest (the automatic map scrolling), so that the map of the area in which the priority object is located can be readily displayed on the display. Further, the shift from the map displayed after the manual map scrolling to the map of the area in which the priority object is located is created by scrolling, which enables the user to recognize the positional relationship between the maps.

These and other objects, features, aspects and advantages of the present invention will become more apparent from the following detailed description of the present invention when taken in conjunction with the accompanying drawings.

BRIEF DESCRIPTION OF DRAWINGS

FIG. 1 A functional block diagram of a map display apparatus according a first embodiment.
FIG. 2 A diagram illustrating a hardware configuration of a map display control device according to the first embodiment.
FIG. 3 A diagram for describing an example of a manual scroll operation.

FIG. 6A FIG. 6B FIG. 6C FIG. 6D A diagram for describing an action of the map display apparatus according to the first embodiment.

FIG. 8 A diagram for describing an example of a condition for starting automatic scrolling.

FIG. 9 A diagram for describing an example of the condition for starting automatic scrolling.

FIG. 13 A diagram for describing an example of a condition for ending the automatic scrolling.

FIG. 14 A diagram for describing an example of the condition for ending the automatic scrolling.

DESCRIPTION OF EMBODIMENTS

First Embodiment

Figure 4:
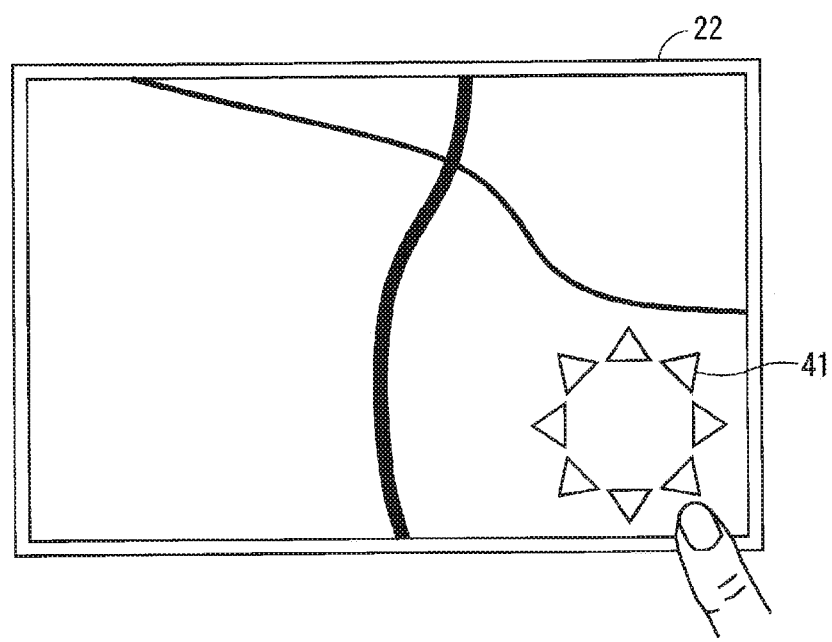
FIG. 4 A diagram for describing an example of the manual scroll operation.

FIG. 1 is a functional block diagram of a map display apparatus 20 according to a first embodiment. The map display apparatus 20 includes a map display control device 10, a map information storage 21, a display 22, and an input device 23 that are connected to the map display control device 10. The map display apparatus 20 is specifically applicable to, for example, car navigation devices, portable navigation devices (PNDs), mobile phones, and smartphones.

The map information storage 21 is a storage medium in which map information is stored. The map information contains various features indicated on a map (including not only real objects such as roads, buildings, railways, and rivers, but also virtual objects such as boundaries and bus routes). The constituent elements of a map indicating the respective features are herein referred to as "objects". The map information storage 21 may be configured in the form of a server that distributes the map information to the map display control device 10 through a communication network such as an Internet line.

The display 22 includes a screen on which the map display control device 10 displays a map. The input device 23 is a user interface that accepts an operation and information input to the map display control device 10 by the user. The display 22 is, for example, a liquid crystal display. The input device 23 may be hardware such as an operation button, a keyboard, a mouse, or a joy stick, or may be a software key being an icon displayed on the screen. A voice recognition device to which the user inputs operation details by voice may be additionally included. In the case where the software key functioning as the input device 23 is displayed on the screen of the display 22, the display 22 and the input device 23 may constitute one touch panel into which their functions are combined.

The user can scroll the map displayed on the display 22 by operating the input device 23. The user's operation for scrolling a map is hereinafter referred to as a "manual scroll operation" and the process in which the map display control device 10 scrolls the map in step with the manual scroll operation is hereinafter referred to as "manual map scrolling". In contrast, the process in which the map display control device 10 automatically scrolls the map is referred to as "automatic map scrolling".

As illustrated in FIG. 1, the map display control device 10 includes a map information acquiring unit 11, a display processor 12, an operation information acquiring unit 13, a scroll processor 14, and a priority object setting unit 15.

The map information acquiring unit 11 acquires map information from the map information storage 21. The display processor 12 generates an image signal for causing the display 22 to display an image, and can cause the display 22 to display a map based on the map information acquired by the map information acquiring unit 11. The operation information acquiring unit 13 acquires information on an operation performed by the user with the input device 23.

The priority object setting unit 15 determines a priority object having higher priority than other objects contained in a map. Although the priority object setting unit 15 may determine which object is to be set as a priority object in any manner, the user assumedly designates a priority object by using the input device 23 in the first embodiment. The priority object setting unit 15 stores the priority object designated by the user even after the map display control device 10 finishes its action.

The priority object is not limited to a dot indicating a spot such as a building or an intersection, and may have a continuous or intermittent elongated shape indicative of, for example, a road, a railway track, an administrative boundary, a river, a coast line, or a bus route. Examples of an object deemed to be intermittent include a river and a railway track running underground in some places, an expressway impassable in some places, an archipelago, and the like.

The scroll processor 14 performs a process of scrolling a map that the display processor 12 has caused the display 22 to display. When the user performs a manual scroll operation, the scroll processor 14 scrolls the map in step with the manual scroll operation (manual map scrolling). Subsequently to the manual map scrolling, upon determining the end of the manual scroll operation, the scroll processor 14 automatically scrolls the map toward the priority object (automatic map scrolling). The "end" of the manual scroll operation encompasses "completion" meaning that the user has accomplished the operation as intended and "suspension" meaning that the user has stopped performing the operation in midstream.

FIG. 2 is a diagram illustrating a hardware configuration of the map display control device 10. As illustrated in FIG. 2, the map display control device 10 includes at least a processor 51, a memory 52 (storage), and an input/output interface 53. The processor 51 executes programs stored in the memory 52 to implement the map information acquiring unit 11, the display processor 12, the operation information acquiring unit 13, the scroll processor 14, and the priority object setting unit 15 that are shown in FIG. 1.

The map information storage 21, the display 22, and the input device 23 shown in FIG. 1 are connected to the input/output interface 53 and controlled by the processor 51 executing the programs stored in the memory 52.

The map information storage 21, the display 22, and the input device 23, which are installed on the map display control device 10 as external hardware in FIG. 1, may be installed inside the map display control device 10. FIG. 2 illustrates one processor 51 and one memory 52. Alternatively, a plurality of processors 51 and a plurality of memories 52 may cooperate with one another to achieve the functions of the elements of the map display control device 10.

The manual scroll operation performed by the user to scroll the map will now be described. In a case where the display 22 and the input device 23 constitute one touch panel, a representative example of the manual scroll operation using the touch panel is a gesture operation on the screen of the display 22 on which a map is displayed (to be more precise, a touch pad as the input device 23 covering the screen). Examples of the gesture operation for enabling the manual scroll operation include a "drag" to slide a finger, with the finger in contact with the screen, and a "flick" to flick the screen with a finger. In a case where the above-mentioned touch panel is a three-dimensional touch panel, a gesture operation to slide a finger through the air is also applicable to the manual scroll operation.

FIG. 3 illustrates a manual scroll operation by a drag on the display 22 (touch panel). In response to the user's drag on the screen of the display 22, the map display control device 10 scrolls the map displayed on the display 22 in agreement with the direction of the drag (the direction toward the lower left in FIG. 3) and the length thereof (the distance over which the finger is shifted).

As illustrated in FIG. 4, an icon for use in manual scroll operations (a scroll operation icon) 41 may be displayed on the screen of the display 22 (touch panel). In this case, to perform a manual scroll operation, the user designates the direction in which the map is to be scrolled by using the scroll operation icon 41. That is, while the user touches any one of direction keys of the scroll operation icon 41, the map display control device 10 scrolls the map in the direction corresponding to the direction key. In this method, the user can scroll the map just by touching the screen without having to move the finger on the screen.

Figure 5:
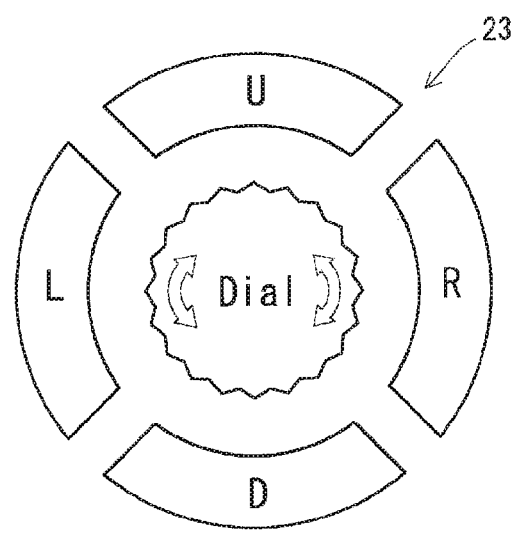
FIG. 5 A diagram for describing an example of the manual scroll operation.

The manual scroll operation may be performed by using the input device 23 being hardware. For example, the input device 23 may include hardware keys for manual scroll operation as illustrated in FIG. 5. While the user depresses any one of the direction keys, the map display control device 10 may scroll the map in the direction corresponding to the direction key. A dial located in the central part of the input device illustrated in FIG. 5 is for use in, for example, zooming in or out on a map.

FIGS. 6A, 6B, 6C and 6D illustrates an overview of an action of the map display apparatus 20 according to the first embodiment. The automatic map scrolling in the present invention by the map display apparatus 20 presupposes a priority object preset in the priority object setting unit 15. Here, a specific road is assumedly set as the priority object. With reference to FIGS. 6A, 6B, 6C and 6D, the specific road being the priority object is indicated by a thick line.

FIGS. 6A, 6B, 6C and 6D show not only the map displayed on the screen of the display 22 but also a map extending off the map on display. The map scrolling is expressed as the shift of the screen (a rectangle enclosed by a double line) of the display 22 on the map. Thus, the direction in which the display 22 shifts in FIGS. 6A, 6B, 6C and 6D is opposite to the direction in which the map is scrolled on the display 22. For example, when the map displayed on the display 22 is scrolled to the lower left as illustrated in FIG. 3, the screen of the display 22 shown FIGS. 6A, 6B, 6C and 6D shifts to the upper right correspondingly.

Firstly, as illustrated in FIG. 6A, the priority object is assumedly displayed in the central portion of the screen of the display 22 in the initial state. Starting with this state, the user performs a manual scroll operation, and then, the map display control device 10 scrolls the map in step with the manual scroll operation (manual map scrolling). Here, it is assumed that, subsequent to the manual map scrolling, the priority object is off the screen of the display 22 (is pushed off the screen of the display 22) as illustrated in FIG. 6B.

Subsequently, when the user ends the manual scroll operation, the map display control device 10 automatically scrolls the map displayed on the display 22 as if the screen of the display 22 is drawn toward the priority object as illustrated in FIGS. 6C and 6D (automatic map scrolling). When the priority object is displayed in the central part of the screen of the display 22 due to the automatic map scrolling as illustrated in FIG. 6D, the map display control device 10 ends the automatic map scrolling.

As described above, when the map scrolling according to the user's operation (manual map scrolling) is ended, the map display control device 10 in the first embodiment automatically scrolls the map toward the priority object of interest (automatic map scrolling), so that the map including the priority object can be readily displayed on the display 22. Further, the shift from the map displayed immediately after the manual map scrolling to the map of the area in which the priority object is located is created by scrolling, which enables the user to recognize the positional relationship between the maps, and thus, the map display apparatus 20 with improved operability can be realized.

Figure 7:
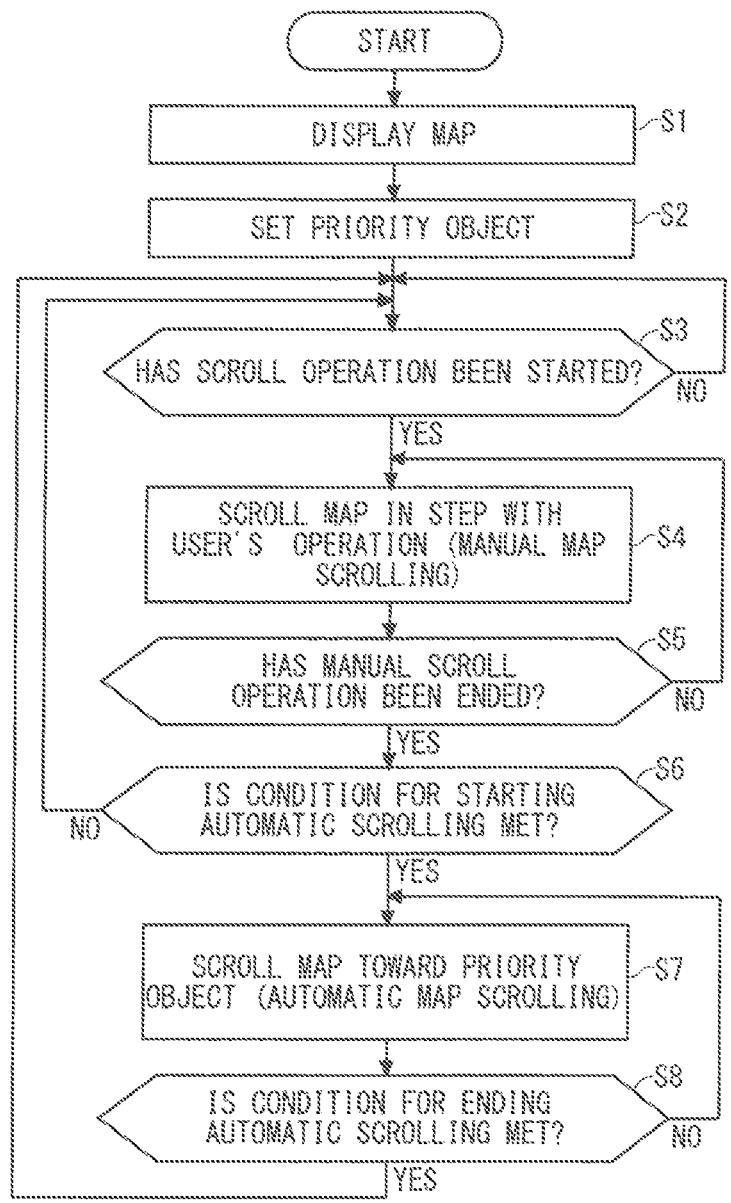
FIG. 7 A flowchart illustrating an action of the map display control device according to the first embodiment.

FIG. 7 is a flowchart illustrating the action of the map display control device 10 according to the first embodiment. The map display control device 10 performs the action in accordance with this flowchart to enable the map display apparatus 20 to perform the action described above with reference to FIGS. 6A, 6B, 6C and 6D.

When the map display control device 10 is activated, the map information acquiring unit 11 acquires map information from the map information storage 21, and then, the display processor 12 causes the display 22 to display the map corresponding to the map information (Step S1). The priority object setting unit 15 sets, as the priority object, an object designated by the user (Step S2). The map to be displayed in Step S1 may be any map. Here, for easy understanding of the description, the map with the priority object at the center of the screen of the display 22 is assumedly displayed.

The map display control device 10 waits for the user to perform a manual scroll operation through the use of the input device 23 (Step S3). When the user starts a manual scroll operation (YES in Step S3), the scroll processor 14 scrolls the map in step with the manual scroll operation (Step S4). That is, the manual map scrolling is performed.

After performing the manual map scrolling, the scroll processor 14 determines whether the manual scroll operation has been ended (Step S5). If the manual scroll operation is in progress (NO in Step S5), Step S4 is performed again to continue the manual map scrolling.

Any method may be employed to determine the end of the manual scroll operation in Step S5. For example, in a case where a predetermined period of time has elapsed with no manual scroll operation since the user performed the manual scroll operation, it is conceivably judged that the manual scroll operation has been ended. Also, after a lapse of a predetermined period time during which the user does not move the finger that is in contact with the screen of the display 22 (for example, when the finger remains at rest for a long time in the middle of the drag), it may be judged that the manual scroll operation has been ended (suspended).

Alternatively, in a case where the user performs, subsequently to the manual scroll operation, a particular operation different from the manual scroll operation, it may be judged that the scroll operation has been ended. For example, in a case where the manual scroll operation started by a drag is followed by a touch on two points including the endpoint of the drag or a double tap on the endpoint of the drag, it is conceivably judged that the manual scroll operation has been ended.

When the end of the manual scroll operation is determined (YES in Step S5), the scroll processor 14 judges whether to perform the automatic map scrolling toward the priority object. Such a judgment is made by determining whether a predetermined "condition for starting automatic scrolling" is met (Step S6).

Examples of the condition for starting automatic scrolling will now be described. For example, the automatic scrolling is conceivably started on condition that the priority object is located outside the map displayed on the display 22 as illustrated in FIG. 8. The map may be divided in a mesh pattern with reference to the area displayed on the display 22 as illustrated in FIG. 9, and the automatic scrolling may be started on condition that the priority object is located outside the area on display and the areas adjacent thereto (areas with a sand pattern in FIG. 9).

Figure 10:
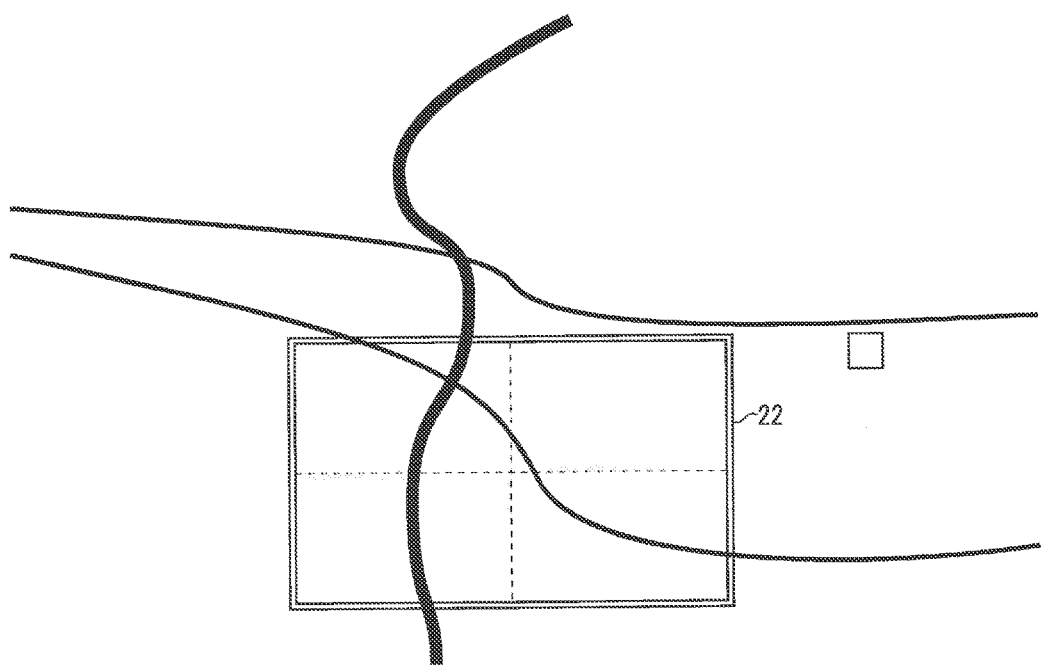
FIG. 10 A diagram for describing an example of the condition for starting automatic scrolling.
Figure 11:
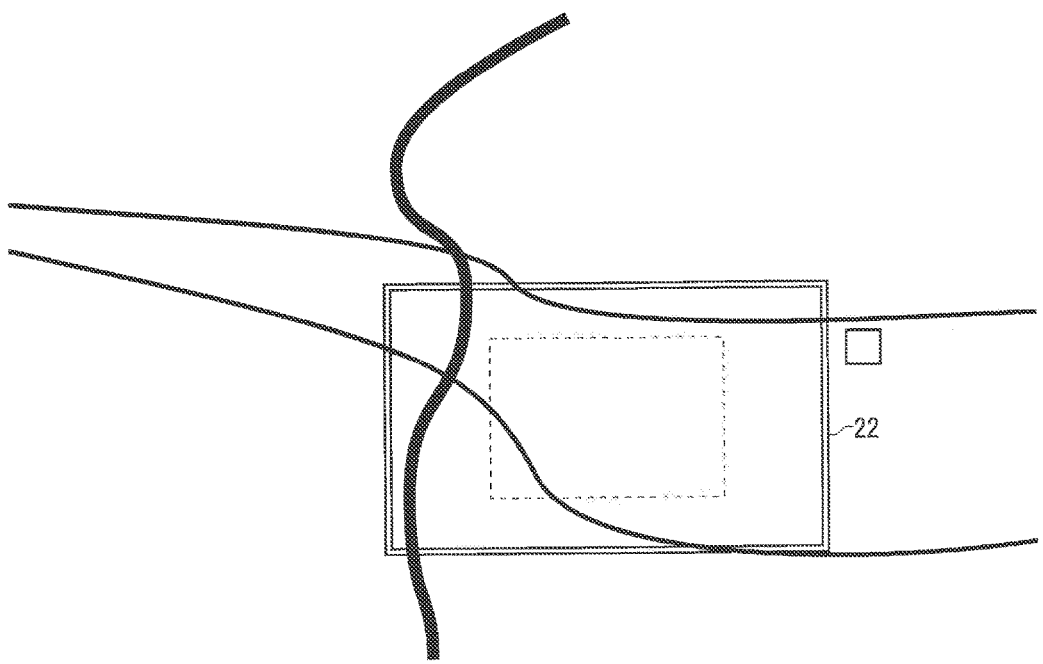
FIG. 11 A diagram for describing an example of the condition for starting automatic scrolling.

Alternatively, the condition for starting automatic scrolling may include the state in which the priority object is displayed on the display 22. For example, irrespective of whether the priority object is displayed on the display 22, the automatic scrolling may be started on condition that no priority object is displayed, as illustrated in FIG. 10, at a specified position on the screen (the center of the screen in FIG. 10) of the display 22. Still alternatively, the automatic scrolling may be started on condition that no priority object is displayed, as illustrated in FIG. 11, in a specified area (in a rectangle enclosed by a broken line in FIG. 11) on the screen of the display 22.

Referring back to FIG. 7, if the condition for starting automatic scrolling is met (YES in Step S6), the scroll processor 14 automatically scrolls the map toward the priority object (Step S7). That is, the automatic map scrolling toward the priority object is performed. If the condition for starting automatic scrolling is not met (NO in Step S6), no automatic map scrolling is performed and Step S3 is performed again to wait for another manual scroll operation.

When the priority object is a dot indicating a spot, the direction toward the priority object is uniquely identified. Thus, a scroll in the automatic map scrolling may be directed straight toward the priority object. In contrast, when the priority object has an elongated shape, the direction toward the priority object cannot be uniquely identified. Thus, the scroll processor 14 needs to determine, based on a predetermined rule, toward which part of the priority object the map is to be scrolled.

Figure 12:
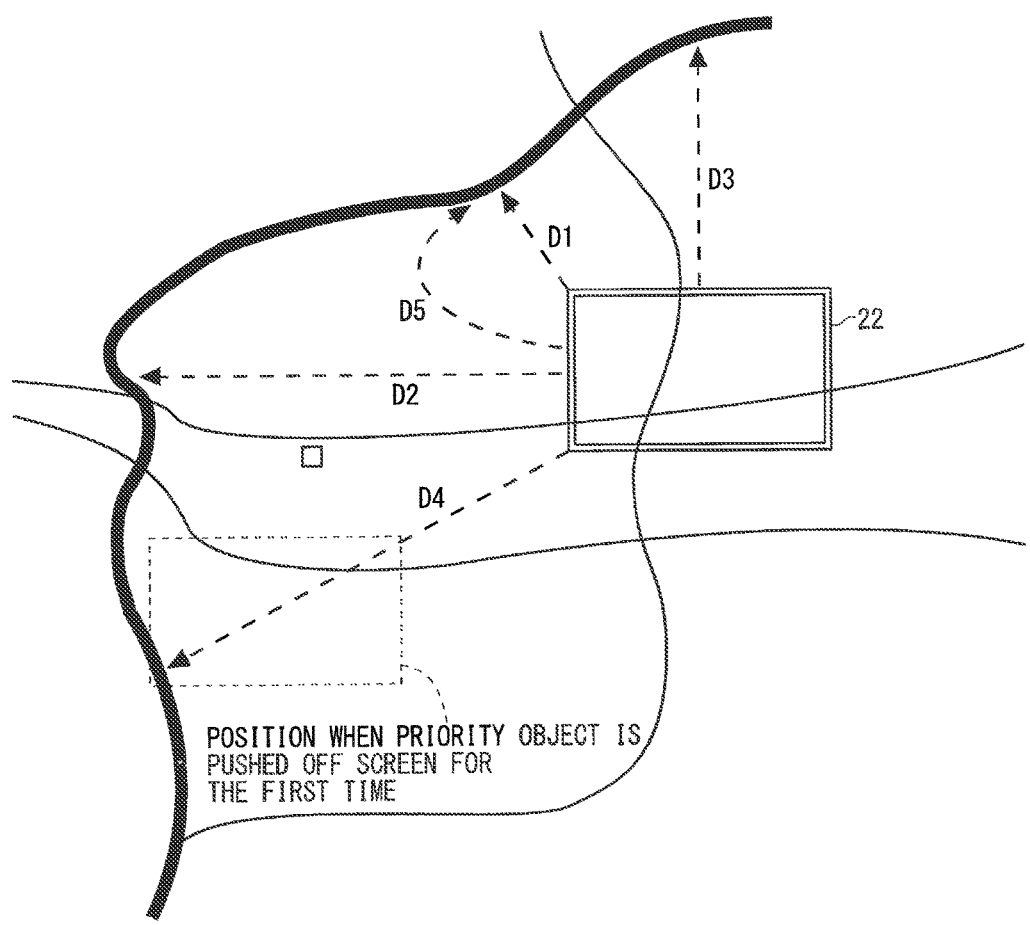
FIG. 12 A diagram illustrating examples of scroll directions in the automatic map scrolling.

FIG. 12 is a diagram illustrating an example of a rule to be followed when determining the scroll direction. Here, a specific road is assumedly set as the priority object having an elongated shape. For example, a direction D1 in FIG. 12, which is a direction toward a part of the priority object closest to the map displayed on display 22, may be determined as the scroll direction. As indicated by a direction D2, the scroll may be directed toward a part of the priority object ahead of the map displayed on the display 22 in the direction horizontal to the screen. As indicated by a direction D3, the scroll may be directed toward a part of the priority object ahead of the map displayed on the display 22 in the direction vertical to the screen. As indicated by a direction D4, the scroll may be directed toward the part of the priority object that remained in the screen of the display 22 to the last moment as the priority object was being pushed off the screen for the first time by the manual map scrolling in Step S4.

As indicated by a direction D5, the scroll may be performed in a curvilinear direction such that the scroll direction immediately before the end of the automatic map scrolling is in agreement with the direction in which the priority object extends. The curvilinear scrolling is also applicable to the examples indicated by the directions D1 to D4.

Referring back to FIG. 7 again, while performing the automatic map scrolling in Step S7, the scroll processor 14 judges whether to end the automatic map scrolling. Such a judgment is made by determining whether a predetermined "condition for ending automatic scrolling" is met (Step S8). If the condition for ending automatic scrolling is not met (NO in Step S8), the automatic map scrolling in Step S7 is continued. If the condition for ending automatic scrolling is met (YES in Step S8), the automatic map scrolling is ended, and then, Step S3 is performed again.

Figure 15:
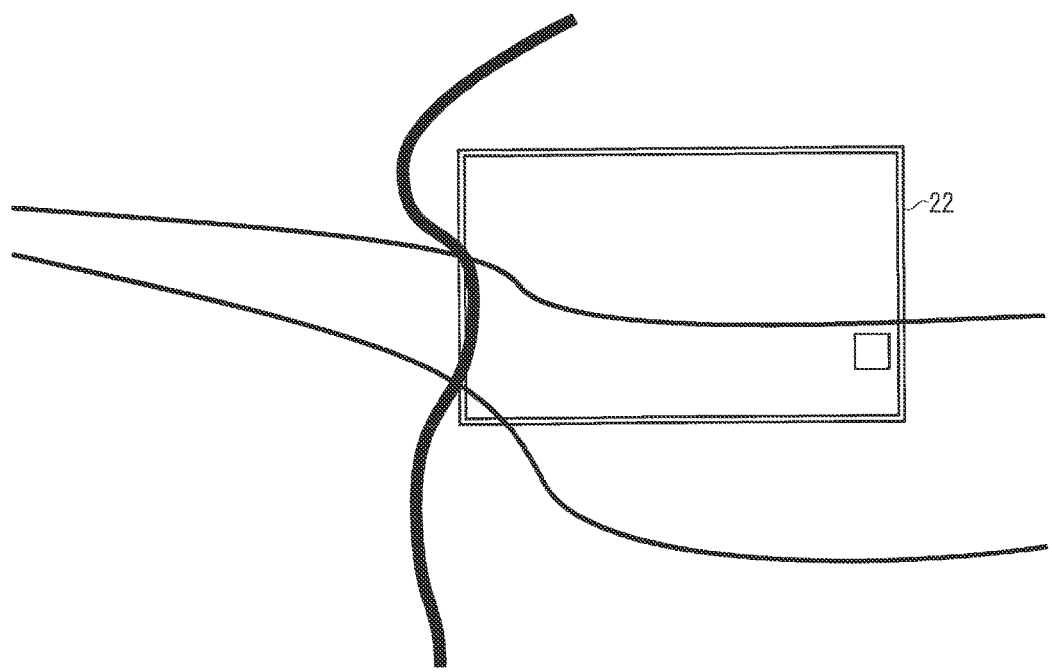
FIG. 15 A diagram for describing an example of the condition for ending the automatic scrolling.

Examples of the condition for ending automatic scrolling will now be described. For example, the automatic scrolling is conceivably ended on condition that the priority object is displayed, as illustrated in FIG. 13, at a specified position on the screen (the center of the screen in FIG. 13) of the display 22. Alternatively, the automatic scrolling may be ended on condition that the priority object is displayed, as illustrated in FIG. 14, in a specified area (in a rectangle enclosed by a broken line in FIG. 14) on the screen of the display 22. Still alternatively, the automatic scrolling may be ended on condition that a part of the priority object enters the screen of the display 22 as illustrated in FIG. 15.

Figure 16:
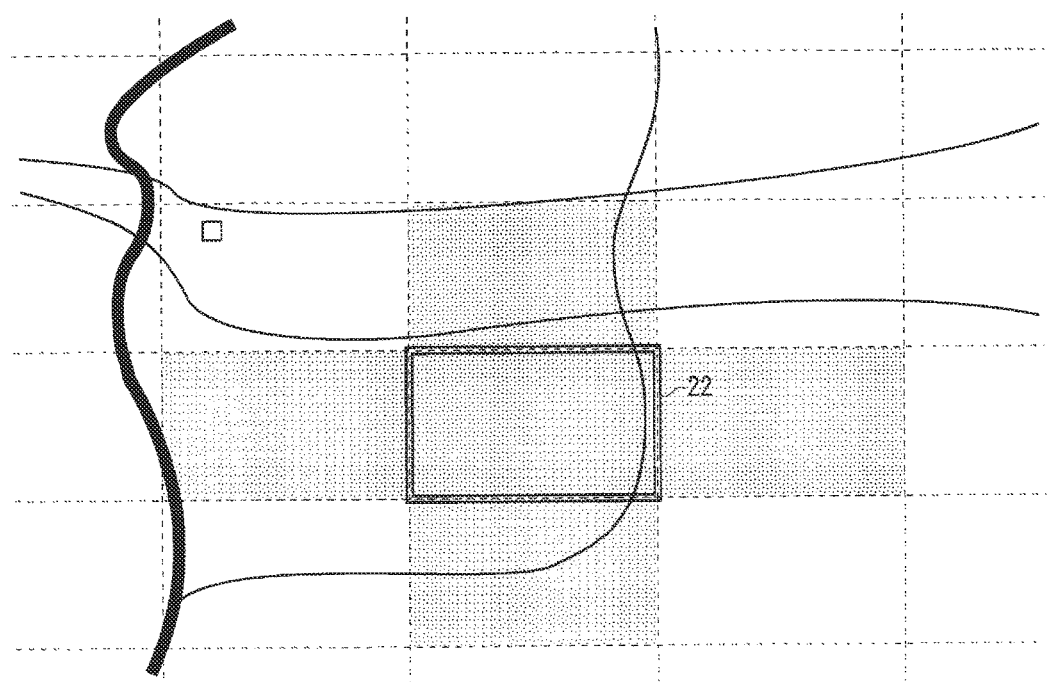
FIG. 16 A diagram for describing an example of the condition for ending the automatic scrolling.

The condition for ending automatic scrolling may include the state in which no priority object is displayed on the display 22. For example, the map may be divided in a mesh pattern with reference to the area displayed on the display 22 as illustrated in FIG. 16, and the automatic map scrolling may be ended on condition that the priority object enters the area on display or any of the areas adjacent thereto (any area with a sand pattern in FIG. 16).

FIGS. 17 to 20 each illustrate, as an example, changing of the scroll speed in the automatic map scrolling. In each graph shown in the drawings, the axis of abscissas indicates the amount of time that has elapsed since the scroll processor 14 determined the end of the automatic scroll operation, and the axis of ordinates indicates the scroll speed in the automatic map scrolling.

Figure 17:
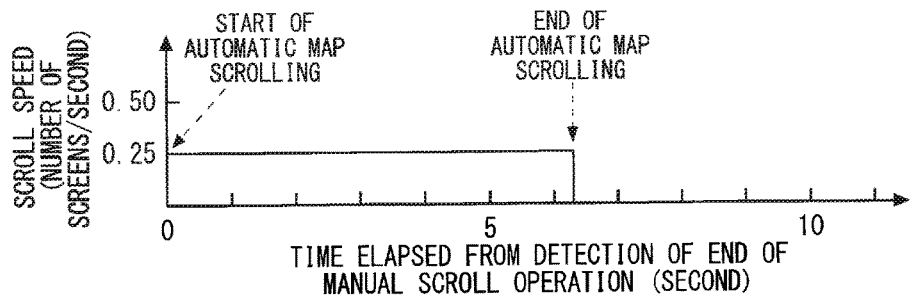
FIG. 17 A diagram illustrating, as an example, the changing of the scroll speed in the automatic map scrolling.

In the above description, as illustrated in FIG. 17, the automatic map scrolling is started immediately after the end of the manual scroll operation is determined. Alternatively, as illustrated in FIG. 18, the automatic map scrolling may be started after a fixed period of time from when the end of the manual scroll operation is determined.

Figure 18:
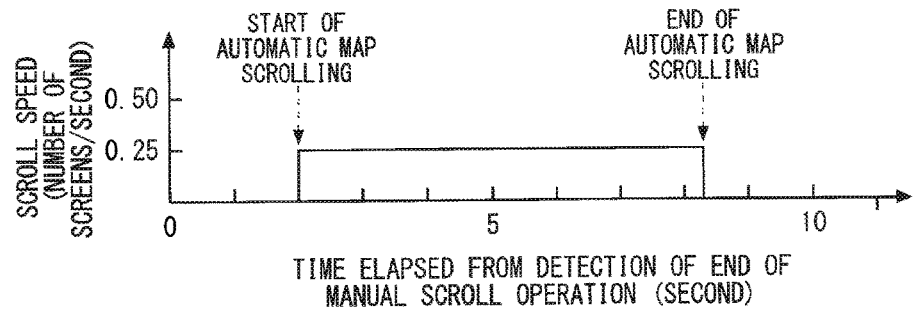
FIG. 18 A diagram illustrating, as an example, the changing of the scroll speed in the automatic map scrolling.
Figure 19:
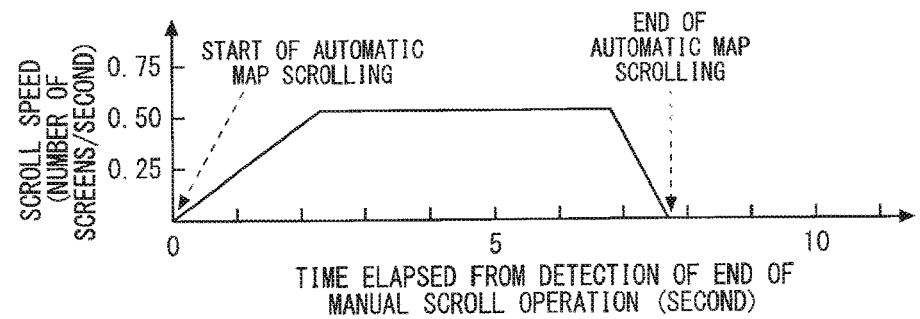
FIG. 19 A diagram illustrating, as an example, the changing of the scroll speed in the automatic map scrolling.
Figure 20:
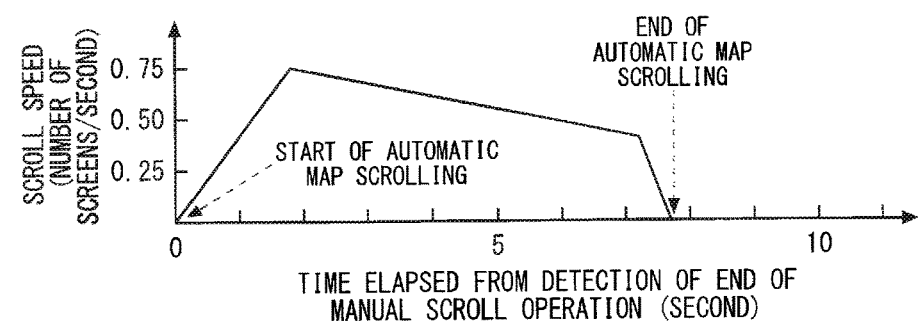
FIG. 20 A diagram illustrating, as an example, the changing of the scroll speed in the automatic map scrolling.

It is not always necessary that the scroll speed in the automatic map scrolling be constant as in FIGS. 17 and 18, and thus, the scroll speed may vary in accordance with a predetermined rule. For example, as illustrated in FIG. 19, the scroll speed may increase gradually immediately after the start of the automatic map scrolling and may decrease gradually immediately before the end of the automatic map scrolling. As illustrated in FIG. 20, the scroll speed may vary according to the distance between the map displayed on the display 22 and the priority object. In the example illustrated in FIG. 20, the map displayed on the display 22 is scrolled at a higher speed when being farther from the priority object and the scroll speed changes in a manner to decrease as the map approaches the priority object. The scroll speed may change in a continuous or stepwise manner. When the map displayed on the display 22 is at great distance from the priority object, scrolling from one part to another may be skipped (jumped over).

In some embodiments, the user may adjust, to his/her liking, the condition for starting automatic scrolling, the condition for ending automatic scrolling, and the scroll direction and the scroll speed in the automatic map scrolling. In addition, when feeling no need to perform the automatic map scrolling toward the priority object, the user may halt the function of automatic map scrolling.

Second Embodiment

The map display control device 10 in the first embodiment automatically starts the automatic map scrolling toward the priority object when determining the end of the manual scroll operation. In a second embodiment, after determining the end of the manual scroll operation, the map display control device 10 starts the automatic map scrolling only with permission by the user.

Figure 21:
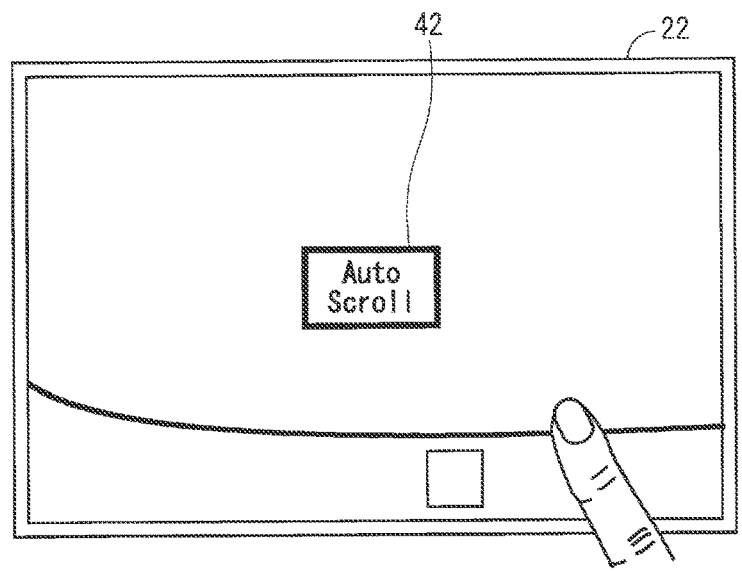
FIG. 21 A diagram illustrating an example of an automatic scroll start icon in a second embodiment.

In the map display control device 10 in the second embodiment, when the scroll processor 14 determines the end of the manual scroll operation, the display processor 12 causes the display 22 to display, as illustrated in FIG. 21, an automatic scroll start icon 42 preparatory to the execution of the automatic map scrolling. In response to the user's operation on the automatic scroll start icon 42, the scroll processor 14 judges that the user's permission is given, and only in such a case, starts the automatic map scrolling toward the priority object.

In a case where a predetermined period of time has elapsed with no operation on the automatic scroll start icon 42 since the automatic scroll start icon 42 was displayed on the display 22, the display processor 12 desirably eliminates the automatic scroll start icon 42.

In the present embodiment, the automatic map scrolling is started only with permission by the user (only when the user operates the automatic scroll start icon 42). This is advantageous when the user feels a need to keep the state in which the map obtained by the automatic map scrolling is displayed on the display 22.

Figure 22:
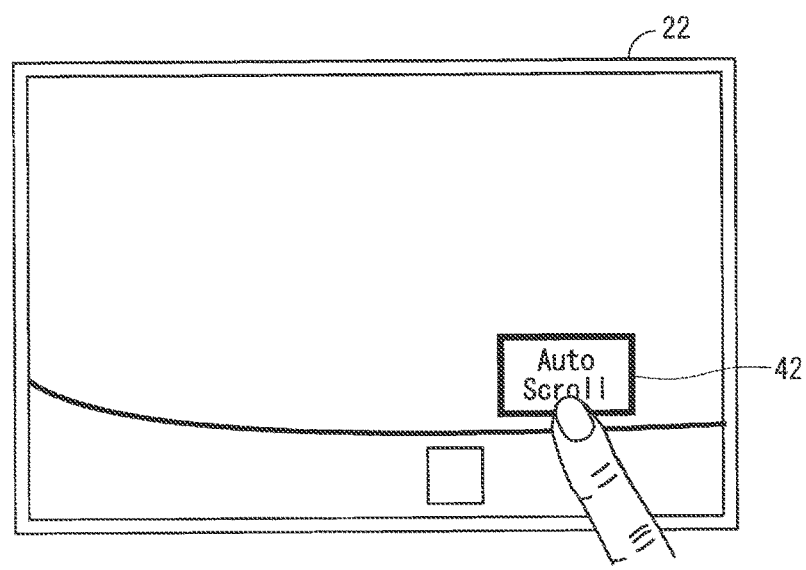
FIG. 22 A diagram illustrating an example of the automatic scroll start icon in a second embodiment.

Although the automatic scroll start icon 42 is displayed in the central portion of the screen of the display 22 in FIG. 21, it may be displayed in any position. For example, in the case where the display 22 and the input device 23 constitute one touch panel, the automatic scroll start icon 42 may be displayed, as illustrated in FIG. 22, at the position corresponding to the endpoint of a manual scroll operation performed by using a gesture operation (e.g., the position at which the finger is moved off the screen after a drag).

Figure 23:
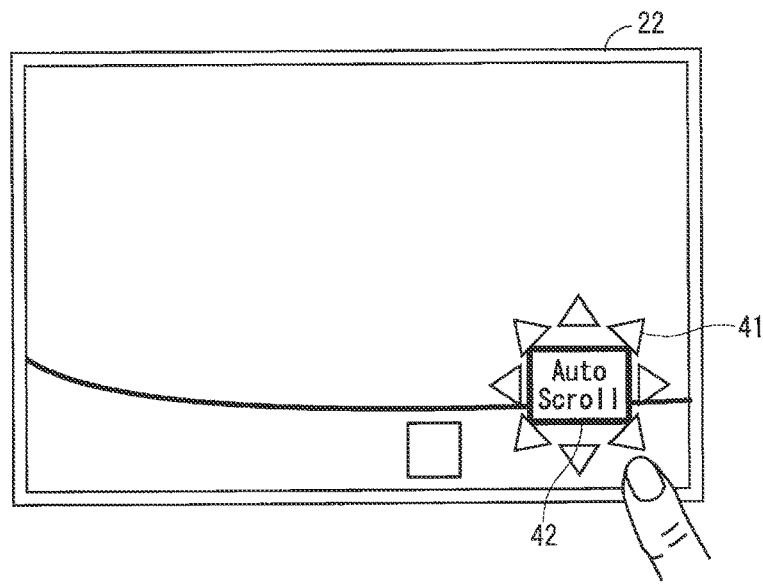
FIG. 23 A diagram illustrating an example of the automatic scroll start icon in a second embodiment.

In the case where the manual scroll operation is performed by using the scroll operation icon 41 (software key) displayed on the display 22 (touch panel) as in the example illustrated in FIG. 4, the automatic scroll start icon 42 is advisably displayed near the scroll operation icon 41 as illustrated in FIG. 23.

Third Embodiment

Figure 24:
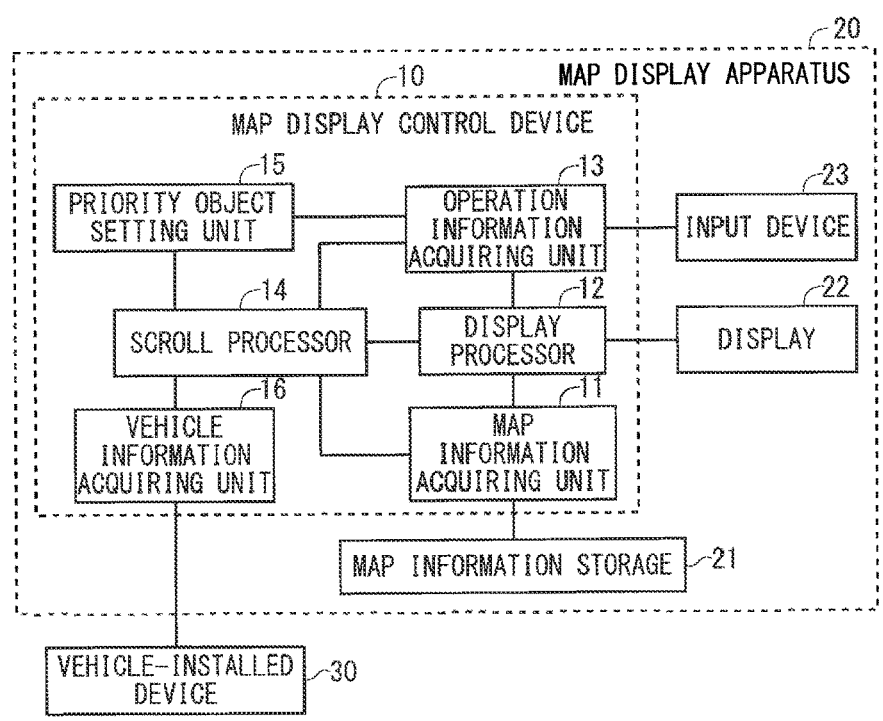
FIG. 24 A functional block diagram of the map display apparatus according to a third embodiment.

In a third embodiment, the following will describe an example application of the present invention to a map display apparatus to be installed on a vehicle, such as a car navigation device. FIG. 24 is a functional block diagram of the map display apparatus 20 according to the third embodiment. The configuration of the map display apparatus 20 in the third embodiment is obtained by adding a vehicle information acquiring unit 16 of the map display control device 10 to the configuration in the first embodiment (FIG. 1).

The vehicle information acquiring unit 16 acquires, from a vehicle-installed device 30 installed on a vehicle (hereinafter referred to as a "host vehicle") having the map display apparatus 20 mounted thereon, vehicle information containing both information on the current position of the host vehicle (hereinafter referred to as a "host vehicle position") and information for use in specifying an expected travel route. Here, the "expected travel route" may be a route from the host vehicle position to the destination or may be an initially expected travel route from the departure point to the destination inclusive of the route already taken by the host vehicle.

The "information for use in specifying an expected travel route" is not limited to information on the expected travel route per se, and may be information for retrieving an expected travel route such as information on the host vehicle position (or the departure point) and the destination. In this case, the vehicle information acquiring unit 16 necessitates a route search function, which can be implemented by a navigation device or the like. The vehicle information acquiring unit 16 may acquire host vehicle information such as information on the direction in which the host vehicle is headed and the travel speed, and may use the acquired information to perform a map matching process for locating the host vehicle with greater accuracy. The destination may be any place designated by the user or may be predicted by the vehicle information acquiring unit 16 based on travel history records.

Examples of the vehicle-installed device 30 include navigation devices, global navigation satellite system (GNSS) receivers such as global positioning system (GPS) receivers and various vehicle-installed sensors (speedometers and gyro sensors). The vehicle-installed device 30 has the function of transmitting the above-mentioned vehicle information to the vehicle information acquiring unit 16.

In the map display control device 10 in the third embodiment, the priority object setting unit 15 automatically sets, as the priority object, the expected travel route to be taken by the host vehicle. When the map display control device 10 is activated, the display processor 12 displays a map in such a manner that the host vehicle position is shown in the specified position on the screen of the display 22. In the present embodiment, the host vehicle position is assumedly displayed at the center of the screen of the display 22. The host vehicle position may be displayed in any other position on the screen. For example, on the map with the travel direction of the host vehicle displayed as upwards ("heading-up display"), the host vehicle position may be displayed slightly below the center of the screen. While the host vehicle position shifts correspondingly to the traveling host vehicle, the display processor 12 assumedly scrolls the map in such a manner that the host vehicle position is kept displayed at the same position on the screen.

Figure 25:
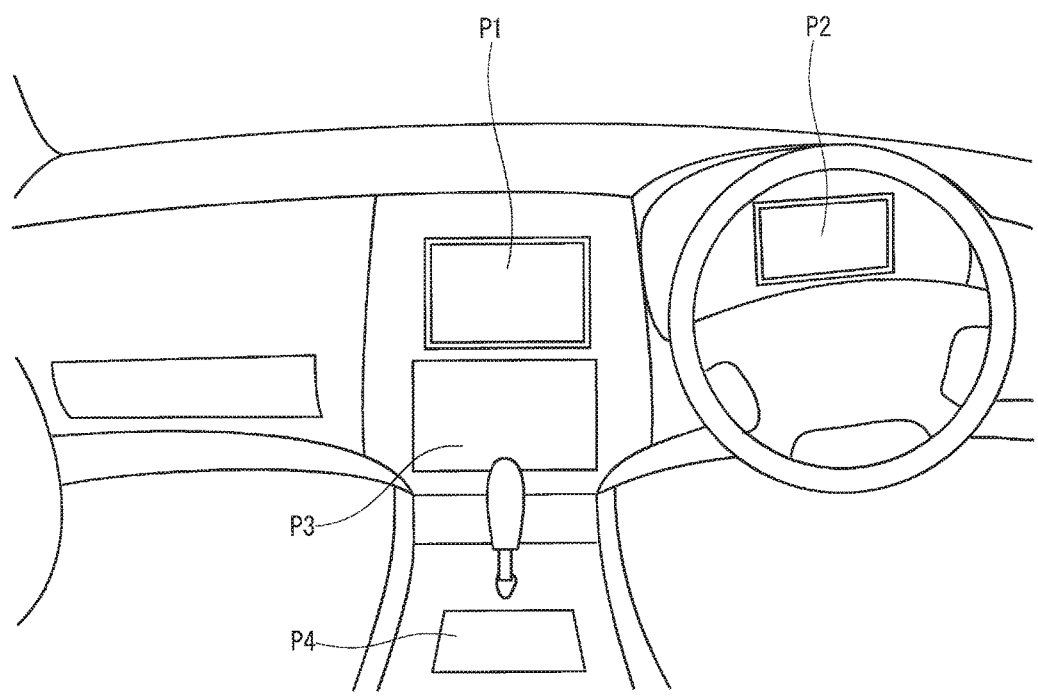
FIG. 25 A diagram for describing an example arrangement of a display and an input device of the map display apparatus according to the third embodiment.

With reference to FIG. 25, the following will describe an example arrangement of the display 22 and the input device 23 of the map display apparatus 20 installed on a vehicle. FIG. 25 illustrates a configuration of a typical dashboard of a vehicle.

In the case where the display 22 and the input device 23 of the map display apparatus 20 constitute one touch panel, the touch panel is preferably disposed on a center panel P1 of the dashboard of the host vehicle, with consideration given to visibility and operability of the touch panel (the operability suffers if the touch panel is disposed on an instrument panel P2).

In contrast, in the case where the display 22 and the input device 23 are separate pieces of hardware, the display 22 may be disposed on the center panel P1 or may be disposed on the instrument panel P2 easily visible to the driver. The input device 23 is advisably disposed in a part P3 below the center panel P1 of the dashboard or in a center console P4.

FIGS. 26A, 26B, 26C and 26D illustrates an overview of the action of the map display apparatus 20 according to the third embodiment. As mentioned above, the priority object setting unit 15 automatically sets, as the priority object (thick line), the expected travel route to be taken by the host vehicle in the third embodiment. When the map display apparatus 20 is activated, the display processor 12 causes the display 22 to display a map in such a manner that the host vehicle (hollow triangle) is shown at the center of the screen as in FIG. 26A. While the host vehicle travels with no manual scroll operation performed by the user, the map is scrolled in such a manner that the host vehicle position is kept displayed at the same position on the screen.

Figure 26A:
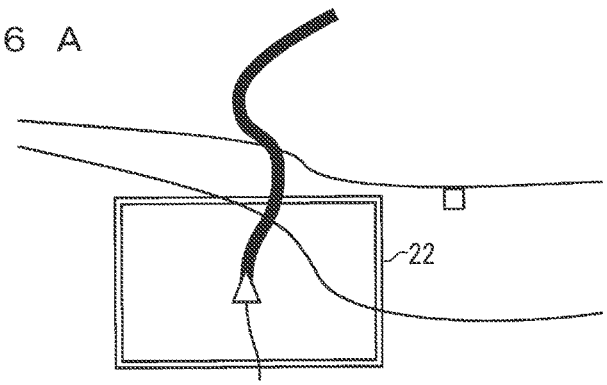
FIG. 26A FIG. 26B FIG. 26C FIG. 26D A diagram for describing the action of the map display apparatus according to the third embodiment.
Figure 26B:
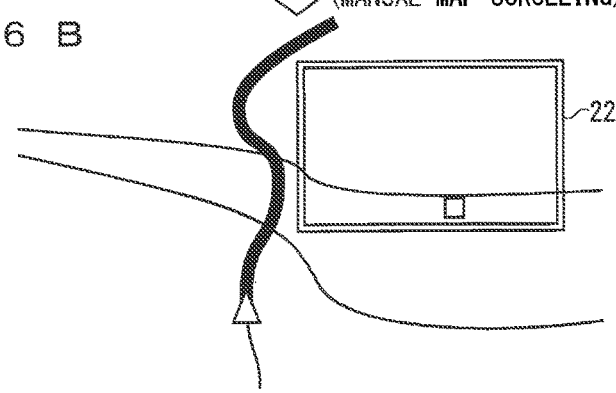
Figure 26C:
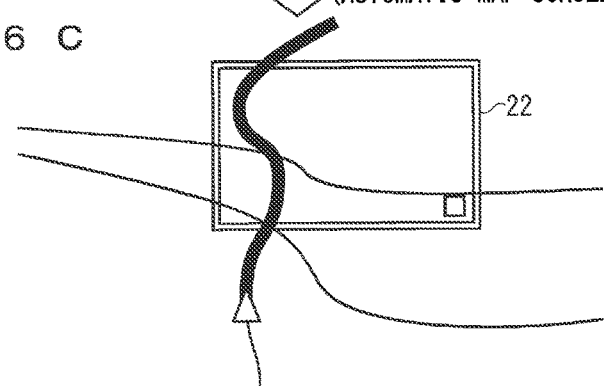
Figure 26D:
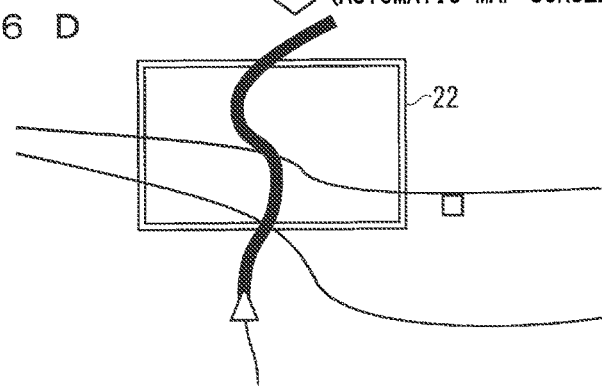

The action of the map display control device 10 in response to the user's manual scroll operation is similar to the action described in the first embodiment with reference to FIGS. 6A, 6B, 6C and 6D. That is, when the user performs a manual scroll operation, the map display control device 10 performs the manual map scrolling accordingly. In a case where the priority object is off the screen of the display 22 as illustrated in FIG. 26B subsequently to the manual map scrolling, the map display control device 10 performs, after the end of the manual scroll operation, the automatic map scrolling toward the priority object as illustrated in FIGS. 26C and 26D. As the automatic map scrolling proceeds, the priority object is eventually displayed on the screen of the display 22 as illustrated in FIG. 26D, and then, the map display control device 10 ends the automatic map scrolling.

Figure 27:
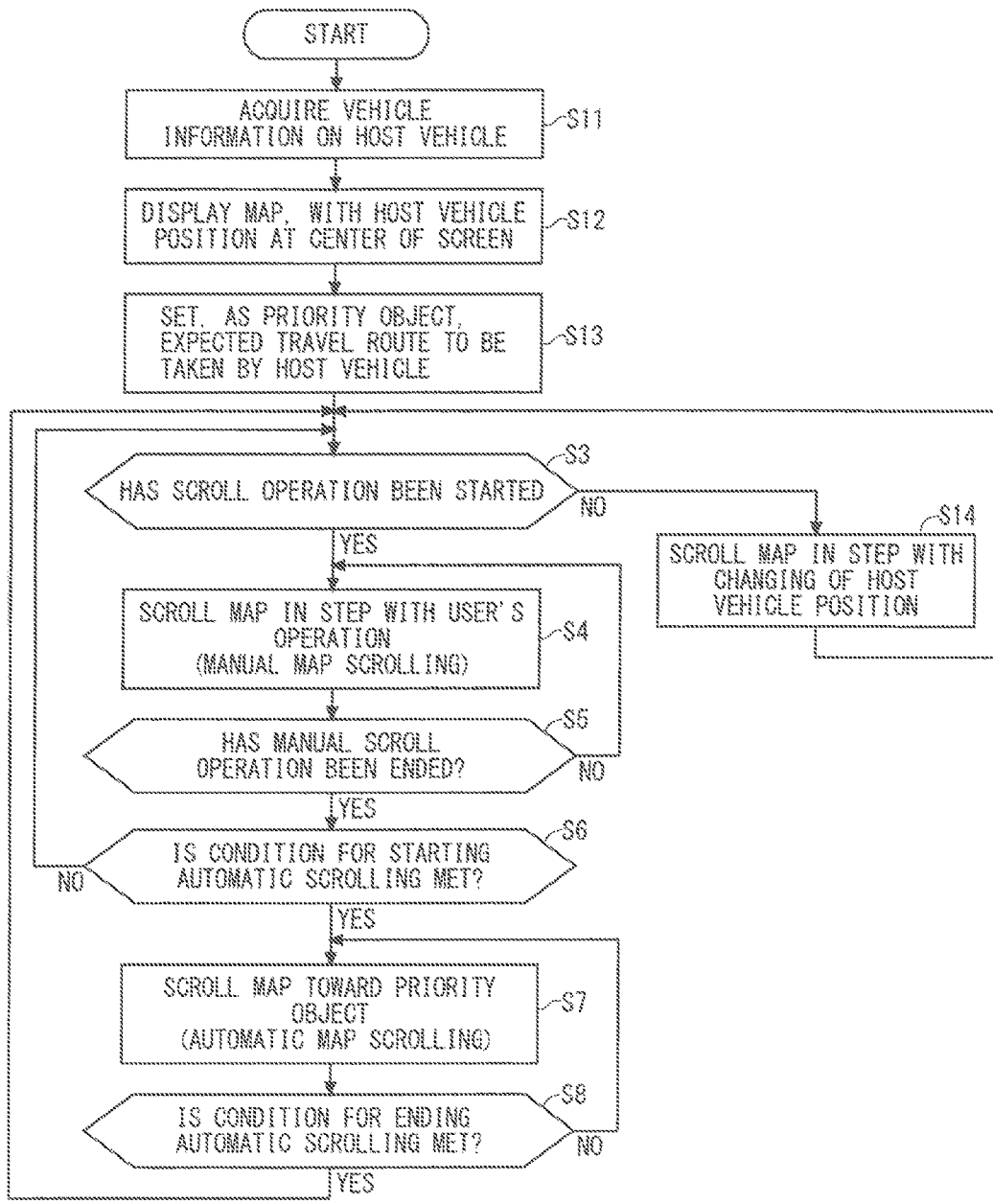
FIG. 27 A flowchart illustrating the action of the map display control device according to the third embodiment.

FIG. 27 is a flowchart illustrating the action of the map display control device 10 according to the third embodiment. The map display control device 10 performs the action in accordance with this flowchart to enable the map display apparatus 20 to perform the action described above with reference to FIGS. 26A, 26B, 26C and 26D. The processes of Steps S3 to S8 in FIG. 27 may be similar to those described above with reference to FIG. 7.

When the map display control device 10 is activated, the vehicle information acquiring unit 16 acquires vehicle information containing information on the host vehicle position and the expected travel route from the vehicle-installed device 30 (Step S11). The display processor 12 displays a map in such a manner that the host vehicle position is shown at the center of the screen of the display 22 based on the information on the host vehicle position acquired by the vehicle information acquiring unit 16 (Step S12). The priority object setting unit 15 sets, as the priority object, the expected travel route, to be taken by the host vehicle, acquired by the vehicle information acquiring unit 16 (Step S13). Since the host vehicle position is the starting point of the expected travel route, the priority object (expected travel route) is displayed on the display 22.

The map display control device 10 waits for the user to perform a manual scroll operation (Step S3). While no manual scroll operation is performed (NO in Step S3), the display processor 12 scrolls the map in step with the changing of the host vehicle position, so that the host vehicle position is kept displayed at the center of the screen of the display 22 while the host vehicle is traveling (Step S14).

When the user starts a manual scroll operation (YES in Step S3), the scroll processor 14 performs map scrolling in step with the manual scroll operation (manual map scrolling) (Step S4), and then, determines whether the manual scroll operation has been ended (Step S5). If the manual scroll operation is in progress (NO in Step S5), Step S4 is performed again to continue the manual map scrolling.

When the end of the manual scroll operation is determined (YES in Step S5), the scroll processor 14 judges whether to perform the automatic map scrolling toward the priority object. Such a judgment is made by determining whether the "condition for starting automatic scrolling" is met as in the first embodiment (Step S6).

If the condition for starting automatic scrolling is met (YES in Step S6), the scroll processor 14 performs the automatic map scrolling toward the priority object (Step S7). If the condition for starting automatic scrolling is not met (NO in Step S6), no automatic map scrolling is performed and Step S3 is performed again to wait for another manual scroll operation. The scroll operation in the automatic map scrolling may be determined as in the first embodiment.

While performing the automatic map scrolling, the scroll processor 14 judges whether to end the automatic map scrolling. Such a judgment is made by determining whether the "condition for ending automatic scrolling" is met as in the first embodiment (Step S8). If the condition for ending automatic scrolling is not met (NO in Step S8), the automatic map scrolling in Step S7 is continued. If the condition for ending automatic scrolling is met (YES in Step S8), the automatic map scrolling is ended, and then, Step S3 is performed again.

The map display apparatus 20 in the third embodiment produces effects similar to those in the first embodiment. The map display control device 10 automatically sets, as the priority object, the expected travel route to be taken by the host vehicle, thereby saving the user from having to designate the priority object. The automatic scroll start icon 42 described in the second embodiment is also applicable to the map display apparatus 20 in this embodiment.

In the above description, the processor 51 in FIG. 2 operates in accordance with the software programs stored in the memory 52 and the like to implement the constituent elements of the map display control device 10, namely, the map information acquiring unit 11, the display processor 12, the operation information acquiring unit 13, the scroll processor 14, the priority object setting unit 15, and the vehicle information acquiring unit 16. Alternatively, each of the above-mentioned constituent elements may be implemented by a signal processing circuit, which is hardware including electric circuits. The word " . . . unit" may be replace by " . . . processing circuit", which expresses a concept encompassing both a constituent element implemented by software and a constituent element implement by hardware.

In the present invention, the above embodiments can be arbitrarily combined, or each embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

EXPLANATION OF REFERENCE NUMERALS

10 map display control device, 11 map information acquiring unit, 12 display processor, 13 operation information acquiring unit, 14 scroll processor, 15 priority object setting unit, 16 vehicle information acquiring unit, 20 map display apparatus, 21 map information storage, 22 display, 23 input device, 30 vehicle-installed device, 41 scroll operation icon, 42 automatic scroll start icon, 51 processor, 52 memory, 53 input/output interface.

The invention claimed is:

1. A map display control device comprising:
 a processor to execute a program; and
 a memory to store the program which, when executed by the processor, performs processes of,
  acquiring map information,
  displaying a map based on said map information on a display,
  acquiring information on an operation performed by a user with an input device,
  determining a priority object having higher priority than other objects contained in said map,
  performing manual map scrolling to scroll said map in step with a manual scroll operation performed by the user to scroll said map displayed on said display,
  displaying an automatic scroll start icon on said display when determining that said manual scroll operation has been ended, and
  performing automatic map scrolling to automatically scroll said map toward said priority object when the user operates said automatic scroll start icon,
 wherein said priority object is a dot indicating a spot or has a continuous or intermittent elongated shape.

2. The map display control device according to claim 1, wherein said priority object being a dot comprises a building or an intersection.

3. The map display control device according to claim 1, wherein said priority object having a continuous shape comprises any one of a road, a railway, track, an administrative boundary, a river, a coast line, and a bus route.

4. The map display control device according to claim 1, wherein said priority object having an intermittent shape comprises any one of a river or a railway track running underground in at least one place, an expressway impassable in at least one place, and an archipelago.

5. The map display control device according to claim 1, wherein in a case where a predetermined period of time has elapsed with no manual scroll operation since the user performed said manual scroll operation, said processor judges that said manual scroll operation has been ended.

6. The map display control device according to claim 1, wherein in a case where the user performs, subsequently to said manual scroll operation, a particular operation different from the manual scroll operation, said processor judges that said manual scroll operation has been ended.

7. The map display control device according to claim 1, wherein
 said display and said input device constitute one touch panel, and
 said processor displays said automatic scroll start icon at a position corresponding to an endpoint of said manual scroll operation on said touch panel.

8. The map display control device according to claim 1, wherein in a case where a predetermined period of time has elapsed with no operation on said automatic scroll start icon since said automatic scroll start icon was displayed, said processor eliminates said automatic scroll start icon.

9. The map display control device according to claim 1, wherein in a case where said priority object is not displayed in a specified area on a screen of said display when an end of said manual scroll operation is determined, said processor displays said automatic scroll start icon on said display.

10. The map display control device according to claim 1, wherein in a case where said priority object is located outside said map displayed on said display when an end of said manual scroll operation is determined or in a case where said map is divided in a mesh pattern with reference to an area displayed on said display and said priority object is located outside the displayed area and areas adjacent thereto, said processor displays said automatic scroll start icon on said display.

11. The map display control device according to claim 1, wherein while performing said automatic map scrolling, said processor changes a scroll speed at which said map is scrolled in such a manner that the scroll speed increases gradually immediately after said automatic map scrolling is started and that the scroll speed decreases gradually immediately after said automatic map scrolling is ended.

12. The map display control device according to claim 1, wherein
 said priority object has a continuous or intermittent elongated shape,
 when performing said automatic map scrolling, said processor determines, based on a predetermined rule, toward which part of said priority object said map is to be scrolled, and
 a scroll path in which said map is scrolled includes a curvilinear portion.

13. The map display control device according to claim 1, wherein
 said priority object has a continuous or intermittent elongated shape, and
 immediately before ending said automatic map scrolling, said processor scrolls said map in a direction that is in agreement with a direction in which said priority object extends.

14. The map display control device according to claim 1, wherein
 said map display control device is installed on a vehicle, and
 said processor
  acquires vehicle information containing information for use in specifying an expected travel route to be taken by said vehicle, sets, as said priority object, the expected travel route to be taken by said vehicle.

15. An automatic map scrolling method for a map display control device, said method comprising:
- displaying a map based on map information on a display;
- determining a priority object having higher priority than other objects contained in said map;
- performing manual map scrolling to scroll said map in step with a manual scroll operation performed by a user to scroll said map;
- displaying an automatic scroll start icon on said display when determining that said manual scroll operation has been ended, and
- performing automatic map scrolling to automatically scroll said map toward said priority object when the user operates said automatic scroll start icon,
- wherein said priority object is a dot indicating a spot or has a continuous or intermittent elongated shape.

* * * * *